US012631762B2

(12) United States Patent
Bauerhin et al.

(10) Patent No.: US 12,631,762 B2
(45) Date of Patent: May 19, 2026

(54) METHOD FOR PROVIDING DIFFERENTIAL CODE BIAS (DCB) CORRECTION FOR A GLOBAL NAVIGATION SATELLITE SYSTEM (GNSS)

(71) Applicants: Spaceopal GmbH, Munich (DE); DLR Gesellschaft für Raumfahrtanwendungen mbH, Wessling (DE); DEUTSCHES ZENTRUM FÜR LUFT-UND RAUMFAHRT E.V., Bonn (DE)

(72) Inventors: Andre Bauerhin, Gilching (DE); André Hauschild, Munich (DE); Walter Päffgen, Berg (DE)

(73) Assignees: Spaceopal GmbH, Munich (DE); DLR Gesellschaft für Raumfahrtanwendungen mbH, Wessling (DE)

( * ) Notice: Subject to any disclaimer, the term of this patent is extended or adjusted under 35 U.S.C. 154(b) by 361 days.

(21) Appl. No.: 17/780,585

(22) PCT Filed: Nov. 16, 2020

(86) PCT No.: PCT/EP2020/082197
§ 371 (c)(1),
(2) Date: May 27, 2022

(87) PCT Pub. No.: WO2021/104909
PCT Pub. Date: Jun. 3, 2021

(65) Prior Publication Data
US 2023/0350077 A1 Nov. 2, 2023

(30) Foreign Application Priority Data
Nov. 28, 2019 (EP) ..................................... 19211996

(51) Int. Cl.
*G01S 19/30* (2010.01)
*G01S 19/07* (2010.01)
*G01S 19/29* (2010.01)

(52) U.S. Cl.
CPC ............ *G01S 19/30* (2013.01); *G01S 19/073* (2019.08); *G01S 19/29* (2013.01)

(58) Field of Classification Search
CPC ...... G01S 19/071; G01S 19/073; G01S 19/13; G01S 19/44; G01S 19/40; G01S 19/23;
(Continued)

(56) References Cited

U.S. PATENT DOCUMENTS

| | | | |
|---|---|---|---|
| 2016/0047917 A1* | 2/2016 | Chen ........................ | G01S 19/40 342/357.23 |
| 2016/0377730 A1* | 12/2016 | Drescher ................. | G01S 19/40 342/357.23 |

(Continued)

FOREIGN PATENT DOCUMENTS

| | | |
|---|---|---|
| EP | 3026460 | 6/2016 |

OTHER PUBLICATIONS

Pan, L., Zhang, X., Guo, F., & Liu, J. (2019). GPS inter-frequency clock bias estimation for both uncombined and ionospheric-free combined triple-frequency precise point positioning. Journal of Geodesy, 93(4), 473â487. https://doi.org/10.1007/s00190-018-1176-5 (Year: 2019).*

(Continued)

*Primary Examiner* — Vladimir Magloire
*Assistant Examiner* — Remash R Guyah
(74) *Attorney, Agent, or Firm* — CANTOR COLBURN LLP

(57) ABSTRACT

A method for providing a differential code bias, in particular a primary differential code bias and a secondary differential code bias, in a global navigation satellite system using (Continued)

satellites communicating by using at least a first signal and an additional first signal both having a first carrier frequency and a second signal and an additional second signal both having a second carrier frequency, where a primary differential code bias for the first signal and the second signal is determined and wherein the primary differential code bias is used for determining, and in particular providing, a secondary differential code bias for the additional first signal and the additional second signal.

10 Claims, 4 Drawing Sheets

(58) Field of Classification Search
    CPC .......... G01S 19/43; G01S 19/30; G01S 19/29;
        G01S 3/78; G01S 19/02; G01S 19/06;
        G01S 19/258; G01S 19/46; G01S 19/07;
        G01S 19/00–37; G01S 19/41–49; G01C
        21/20; H04B 7/185–195; H04L 9/00–32;
        H04K 3/00–28; H04W 12/00–12
    USPC ...... 342/357.2–357.78; 455/12.1, 13.1–13.3,
        455/427–430, 132, 133, 137, 140, 143;
        375/130–153, 316, 340–350;
        701/468–472, 478–480, 493–496;
        370/310–350, 431–463; 380/255–276
    See application file for complete search history.

(56) References Cited

U.S. PATENT DOCUMENTS

| | | | |
|---|---|---|---|
| 2017/0090038 A1* | 3/2017 | Saito ...................... | G01S 19/41 |
| 2017/0269229 A1* | 9/2017 | Dai ......................... | G01S 19/32 |
| 2018/0034631 A1* | 2/2018 | Ries ....................... | G01S 19/14 |
| 2020/0041658 A1* | 2/2020 | Laurichesse ........... | G01S 19/44 |

OTHER PUBLICATIONS

Pan, L., Zhang, X., Guo, F., & Liu, J. (2019). GPS inter-frequency clock bias estimation for both uncombined and ionospheric-free combined triple-frequency precise point positioning. Journal of Geodesy, 93(4), 4738487. https://doi.org/10.1007/s00190-018-1176-5 (Year: 2019).*

International Search Report for corresponding application filed Nov. 16, 2020; Mail date Feb. 11, 2021.

Written Opinion for corresponding application filed Nov. 16, 2020; Mail date Feb. 11, 2021.

* cited by examiner

METHOD FOR PROVIDING DIFFERENTIAL CODE BIAS (DCB) CORRECTION FOR A GLOBAL NAVIGATION SATELLITE SYSTEM (GNSS)

TECHNICAL FIELD

The present disclosure concerns a method for providing differential code bias (DCB) correction, in particular a primary differential code bias and, secondary differential code bias, for a global navigation satellite system (GNSS).

BACKGROUND

GNS systems are well known. Examples for GNS systems are GPS, GLONASS, BeiDou and Galileo. They provide a functionality to determine the position of a static or mobile receiver, which can be, for example, integrated into multiple downstream market applications such as geodetic or navigation system and mobile phone receivers. DCBs are required when a different signal or signal combination than a clock reference signal shall be processed. Essential parts of a GNS system are satellites, which orbit the Earth and emit navigation signals. The navigation signals comprise several carrier signals, each with one or more ranging code modulations and, optionally, navigation data modulated onto the ranging code.

DCBs are differential biases between two pseudorange signals on the same or different frequencies. Among the different origins of these biases are instrumental delays and imperfect signal synchronizations in the transmitting and receiving part of the signal processing chain. The DCBs are evaluated based on empirical information gathered by a plurality of reference stations composed of the same or different reference receiver types, but all receiving the signals of the corresponding satellites. The reference stations are providing pseudorange and navigation messages and other information to the DCB estimator. Proper knowledge of biases is crucial to many navigation applications but also to non-navigation applications such as ionospheric analysis, for example extracting ionosphere total electron content (TEC), and time transfer. DCBs are required particularly for code-based positioning in GNSS receivers and other applications.

Furthermore, a DCB estimated for one signal combination cannot be transferred or applied to another signal combination even on the same satellite. Instead, satellite- and receiver-dependent DCBs must be estimated for each signal combination of interest. The reason is that the different components for signal generation and emission on-board of each satellite are affected by individual biases and synchronization errors, which are also frequency- and signal-dependent. Similarly, the different components in the receiver's signal processing chain are also affected by different frequency- and signal-dependent biases.

Further, some signals are handled from reference stations, being not available to the public. Since the number of such reference stations is typically reduced compared to the number of reference stations being available to the public, the DCBs for the signals assigned to the non-public reference stations can only rely on a reduced number of information for evaluating the corresponding DCB.

In U.S. Pat. No. 2,017,009 0038A1 a correction data creation unit receives a value of an error used in satellite positioning at a first time interval, and receives a correction value of the error at a second time interval that is a time interval 1/n (n is an integer of two or larger) time interval of the first time interval. The correction data creation unit also corrects the value of the error at the second time interval by using the correction value.

US 2016 0 047 917 A1 concerns a method for generating receiver-specific correction information for correcting pseudorange observations. The method comprises: receiving raw observations obtained by the NSS receiver observing NSS multiple frequency signals from a plurality of NSS satellites over multiple epochs; obtaining precise satellite information on: (i) the orbit position of each of the satellites, (ii) a clock offset of each of the satellites, and (iii) a set of biases associated with each of the satellites; estimating ambiguities in the carrier phase of the received raw observations, using the precise satellite information, or information derived therefrom; computing combination values based on the received raw observations together with the estimated ambiguities, to cancel out the effects of the geometry, the effects of the clocks, troposphere and ionosphere; and generating the correction information per satellite, based on the computed combination values.

BRIEF SUMMARY

Starting from that prior art mentioned above, the disclosure realizes a method that simplifies providing differential code biases for signals which cannot freely measured or where the number of reference stations are limited, in particular without reducing the reliability of the calculated or estimated differential code biases for a plurality of signals being emitted by the satellites.

The object is solved by a method for providing differential code bias (DCB), in particular a primary differential code bias, in particular a primary estimated differential code bias for measured GNSS signals, and a secondary differential code bias, in a global navigation satellite system (GNSS) using satellites communicating by using at least a first signal, i.e. a first pilot channel signal, and an additional first signal both on the same first carrier frequency band or the same first carrier frequency and a second signal, i.e. a second pilot channel signal, and an additional second signal both on the same second carrier frequency band or the same carrier frequency, wherein primary differential code biases for the first signal and the second signal are determined and in particular provided, for example for calculating a position, in particular a PPP position, of a receiver receiving the first signal and/or the second signal, and wherein the primary differential code biases are used for determining a secondary differential code biases for the additional first signal and the additional second signal, and in particular providing the secondary differential code biases, for example for calculating a position of a receiver receiving the additional first signal and/or the additional second signal.

Contrary to the state of the art, it is provided according to the disclosure to determine the secondary differential code biases for the additional first signal and the additional second signal by using the primary differential code biases for the first signal and the second signal. As a consequence, it is advantageously possible to avoid an isolated calculation or evaluation of the secondary differential code bias.

Instead, the primary differential code bias is used to determine the secondary differential code bias. Especially, the present disclosure takes advantage of using the primary differential code bias being based on the same carrier frequencies as the secondary differential code bias.

The skilled person preferably knows that besides the first signal and the first additional signal there might be further additional first signals on the first frequency or a first frequency band and besides the second signal and the second additional signal there might be further additional second signal on the second frequency band of the second frequency band, wherein providing a further secondary differential code bias can be determined by using the primary differential code and/or the second differential code, in particular as described for determining the secondary differential code. Thus the method can be applied to further additional signals of similar behaviour than the first and the second carrier frequency bands and channels modulated thereof.

Preferably, the global navigation satellite system is used to determine the position of a receiver, in particular, a mobile receiver, such as a mobile telephone or a vehicle and others. Thereby, navigation signals emitted by the satellites of the GNSS are used for measuring pseudoranges that, in turn, are used for determining the position of the receiver. Preferably, for estimating the position, navigation signals of at least four satellites are used. In particular, the primary differential code bias and/or the secondary differential code bias are provided to the receiver for being used to determine the precise position of the receiver, in particular to correct the pseudoranges or its combinations. Furthermore, the navigation signal particularly includes a first signal, the additional first signal, the second signal, the additional second signal and/or a third signal, having a certain carrier frequency. In particular, having a first carrier frequency or having a second carrier frequency means that the first signal or additional first signal component on the one hand or the second signal or additional second signal component on the other hand uses the same carrier frequency. Thereby, the frequency bands or intervals assigned to the first carrier frequency and the second carrier frequency are spectrally separated from each other. Preferably, the differential code bias concerns systematic errors between two GNSS code observations of different carrier frequencies. Such differential code biases for example are taken into account for eliminating such systematic errors from the code observations. Preferably, such differential code biases are evaluated on information gathered together by the plurality of reference stations. Thus, it is possible to estimate, for example, the time evolution of the differential code biases. Preferably, the differential code bias is determined empirically. In particular, for determining and/or providing the primary differential code bias and/or the second differential code bias a computation unit is used, in particular including a microprocessor configured for performing at least one of the methods steps according to the present disclosure. Preferably, the primary differential code bias is provided via separate data channel both terrestrial and via satellite. The DCBs will be preferably applied to provide the clock correction data for the frequency combination to be applied by the end-user. Furthermore, it is preferably provided that the first signal and/or the second signal are unencrypted. In particular the second differential code bias is provided for non-public channels. In particular, it is provided that the method estimates, transforms and provides a corrected differential code bias.

Preferably, the primary differential code bias is transferred to the secondary differential code bias. In other words, the correction of the additional first signal and the additional second signal by the secondary differential code bias is mainly based on the primary differential code bias, without any further complicated calculation and/or transformation. In other words, it is assumed that the secondary differential code bias mainly corresponds to the primary differential code bias, including the assumption that some additional offset may be used.

Furthermore, the skilled person particularly understands the term determining as approximating. Furthermore, it is provided that the primary differential codes concern the relation between the first signal and the second signal to a common signal respectively and that the secondary differential codes concern the relation between the first additional signal and the first signal and/or the relation between the second signal and the additional second signal.

In particular, it is provided that a common signal is used for both approximating the primary code bias and the secondary differential code bias. Especially, it is provided that a primary differential code bias is determined for the first signal and the second signal respectively and in particular provided for approximating the DCBs of the additional first signal and the second additional signal. As a result, the accuracy for determining the position based on the additional first signal and the additional second signal is at least comparable or equal to the accuracy for determining the position based on the first signal and the second signal, for instance, since PPP needs the DCBs for correcting the clock correction, for example.

In particular, it is provided that the common signal is used to determine at least two primary differential code biases, namely DCB1(first signal–common signal) and DCB1(second signal–common signal). In addition to DCB1(first signal–common signal) and DCB1(second signal–common signal) it is possible to determine/approximate the further primary differential code biases DCB1(first additional signal–common signal) and DCB1(second additional signal–common signal). Thus, in a first stage four independent primary differential codes DCB1 are provided, in particular by using at least five signals.

Furthermore, it is provided that the secondary differential code bias represents the differential code bias between the first signal and the additional first signal and the differential code bias between the second signal and the additional second signal, respectively. Especially, it is provided that two dependent secondary differential codes bias DCB2s are provided based on the four independent primary differential code bias DCB1s. Being aware of the second differential code bias it is possible to apply the amount of information and the reliability of data being available for the first signal and the second signal to the additional first signal and the additional second signal, although for approximating the first additional signal and the second additional signal a reduced amount of information is available otherwise, for example information needed for performing a PPP.

In particular, it is provided to deduce the second differential codes by

DCB2(first signal-additional first signal)=DCB1(first signal–common signal)–DCB1(first additional signal–common signal)

DCB2(second signal-additional second signal) =DCB1(second signal–common signal)–DCB1 (second additional signal–common signal).

Thereby, the first signal and the additional first signal are tracked by a first receiver, wherein the second signal and the additional signal are tracked by a second receiver and wherein the common signal is tracked by the first receiver and the second receiver. As a consequence, it is possible to provide well protected high accuracy data to the second receiver, although the information for differential code biases of the additional first signal and the additional second signal are limited, for example due to a limited number of reference stations, which are used for providing data for calculating the necessary information. Thus, it is possible to provide also sub-nanosecond and sub-decimetre resolution, when determining the position of the second receiver, which has access to the additional first signal and the additional second signal, to which only a reduced amount of information can be made available otherwise.

Preferably, the first receiver and the second receiver are different types of receiver. Especially, the first receiver and the second receiver differ in the ability to observe and/or analyse specific signals. In other word: While the first receiver can observe and/or analyse the first signal and the second signal, the first receiver cannot observe and/or analyse the additional first signal and the additional second signal. At the same time, the second receiver can observe and/or analyse the additional first signal and the additional second signal, while the second receiver cannot observe and/or analyse the first signal and second signal. For establishing the difference between the first receiver and the second receiver, the first receiver and the second receiver distinguish from each other by hardware and/or software, such as a correlator implementation. Especially, the first receiver and the second receiver have different PRS certifications.

In a preferred embodiment of the present disclosure, the second signal and/or the additional second signal comprises correction information for precise point positioning. For improving the positioning accuracy without the dependency on a dense reference station network in the vicinity of the mobile receiver, the precise point positioning (PPP) method has been developed. In contrast to the DGPS or RTK, the PPP approach does not rely on the spatial error correlation of differential measurements, but instead eliminates the individual error components caused by, for example, satellite orbit or clock, biases and atmospheric delays, through precise models in the calculation of the position for the mobile receiver. Thus, it is possible to calculate positions accurate to a decimetre or even below with dual-frequency measurements. It is essential for realizing such an accuracy to provide precise correction information, in particular precise orbit and clock correction information. For this reason, the navigation information for the "additional or non-public" service to be corrected as well as the navigation information to the "first or public" service is required. Further, PPP allows a precise determination of the position of the mobile receiver even in regions without a dense reference station network. Examples for realizing a PPP approach can be found in EP 10 94 428 A2 and in EP 2 281 210 B1 of which the contents regarding PPP are herewith referred to explicitly.

In a different preferred embodiment, it is provided that the additional first signal is only available for a sub-group of users. In particular, the additional first signal and/or the additional second signal includes information that is not needed by the majority of users. For example, the additional first signal and the additional second signal are only provided to authorized users having access to the additional first signal and the additional second signal. For example, the additional first signal and/or the additional second signal are encrypted in order to allow only a certain sub-group of users to use the information encoded in the additional first signal and/or the additional second signal. In particular, it is provided that the additional first signal and the additional second signal are handled by reference stations, whereas the first signal and the second signal are handled from different reference stations, which only handle the first signal and the second signal and/or the third signal, but not the additional first signal and/or the additional second signal. Since the number of reference stations handling the additional first signal and/or the additional second signal is reduced compared to the reference station that handles the first signal, the second signal and the third signal calculating the secondary DCB relies only on the few information of the reduced numbers of reference stations. Therefore, using or determining the secondary differential code bias by using the first differential code bias improves the reliability of the secondary differential code bias for the additional first signal and the additional second signal.

In particular, it is provided that for increasing the accuracy of positioning a member of the subgroup the determination of corrections, being used for positioning, positioning is relied on information being assigned to the first signal and/or the second signal, being provided to the first receiver. In particular, the member of the subgroup is represented by the second receiver.

Preferably, the first signal and the third signal having the third frequency are used for dual frequency measurements. By using the dual frequency measurements, it is possible to determine the effects of the ionosphere. Especially, it was known by the prior art to use the first signal and the third signal, which are used anyway for dual frequency measurements, to utilize for calculating the differential code bias. However, since the additional second signal has not the third carrier frequency, the tertiary differential code bias cannot be used for determining the secondary differential code bias.

Preferably, the first differential code bias and/or the secondary differential code bias is used for correcting the ephemerides and/or are usually transmitted as part of satellite correction messages. The DCB information from these messages can then be used to use signals or signal combinations, which differ from clock reference signals.

Preferably, the primarily differential code bias is determined by information encoded, in particular by using the pseudorange observations, on the first signal and the second signal. Thus, it is possible to calculate and/or evaluate the primary differential code bias that is subsequently used for determining the secondary differential code bias.

In particular, a time evaluation of the primary differential code bias and/or the secondary differential code bias is determined. For example, it is conceivable that the primary differential code bias and, consequently, the secondary differential code bias are evaluated or estimated based on observation recorded in the past to the correction period. Considering the time evaluation in the past, it is possible to extrapolate the time evaluation of the primary differential code bias and consequently, of the secondary differential code bias.

Preferably, the primary differential code bias and/or the secondary differential code bias is provided in near real-time. Especially, by using the extrapolation or time evaluation of the primary differential code bias, it is possible to provide a primary or secondary differential code bias, such that they can be used, for example, for real-time estimations of the position of the receiver.

Preferably, the method further comprises receiving raw data from satellites at a plurality of reference stations;

forwarding the raw data received at the reference stations to a central computation unit, in particular to a single central computation unit, in a real-time data stream;

7 determining the correction information at the computation unit based on the raw data received from the different reference stations and transmitting the correction information via at least one satellite or terrestrial link to the receiver for determining a position of the mobile receiver. In particular, it is provided that a central computation unit collects all raw data and determines the correction information, in particular the combined orbit error, clock offset, signal bias and additional correction information, and subsequently the correction information message is transmitted to the mobile receiver, which implements means of authentication via at least one GNS (global navigation satellite), preferably via each GNS that provides the raw data to the certain mobile receiver. Thus, it is possible to take the raw data of a large number of reference stations into account for determining the correction information for establishing the desired accuracy at one central computation unit. Further, the present disclosure allows central dissemination of the correction information. As a consequence, no communication between different distribution centres is needed. Another benefit of using the GNS for broadcasting the correction information is the possibility of using the infrastructure already available from existing satellites and no additional terrestrial or spaceborne transmitters are needed.

Another aspect of the present disclosure is a plurality of reference stations and a central computation unit, in particular a single central computation unit, configured for providing a differential code bias, in particular a primary differential code bias and a secondary differential code bias, in a global navigation satellite system using satellites communicating by using at least a first signal and an additional first signal both having a first carrier frequency and a second signal and an additional second signal both having a second carrier frequency;

wherein a primary differential code bias for the first signal and the second signal is determined by the central computation unit and wherein the primary differential code bias is used for determining, and in particular providing, a secondary differential code bias between the additional first signal and the additional second signal. The features and benefits described in the context of the method for providing a differential code bias apply to the plurality of reference stations and the central computation unit analogously and vice versa.

Preferably, the central computation is further configured for receiving raw data from satellites at a plurality of said reference stations;

forwarding the raw data received at the reference stations to said central computation unit, in particular to said single central computation unit, using a data stream, in particular a common data stream;

determining a correction information at the computation unit based on the raw data provided from the different reference stations and transmitting the correction information via at least one satellite and/or terrestrial communication means to the receiver or determining a position of the mobile receiver.

In particular, the plurality of reference stations includes a reference station handling the additional first signal and/or the additional second signal.

Another aspect of the present disclosure is a software product and/or a network, wherein the software product and/or the network comprises program code for implementing one of the methods according to the present disclosure.

The features and benefits described in the context of the method for providing a differential code bias apply to the software product and/or the network analogously and vice versa.

Wherever not already described explicitly, individual embodiments or their individual aspects and features can be combined or exchanged with one another without limiting or widening the scope of the described disclosure, whenever such a combination or exchange is meaningful and in the sense of this disclosure. Advantages which are described with respect to one embodiment of the present disclosure are, wherever applicable, also advantageous of other embodiments of the present disclosure.

DETAILED DESCRIPTION

Figure 1:
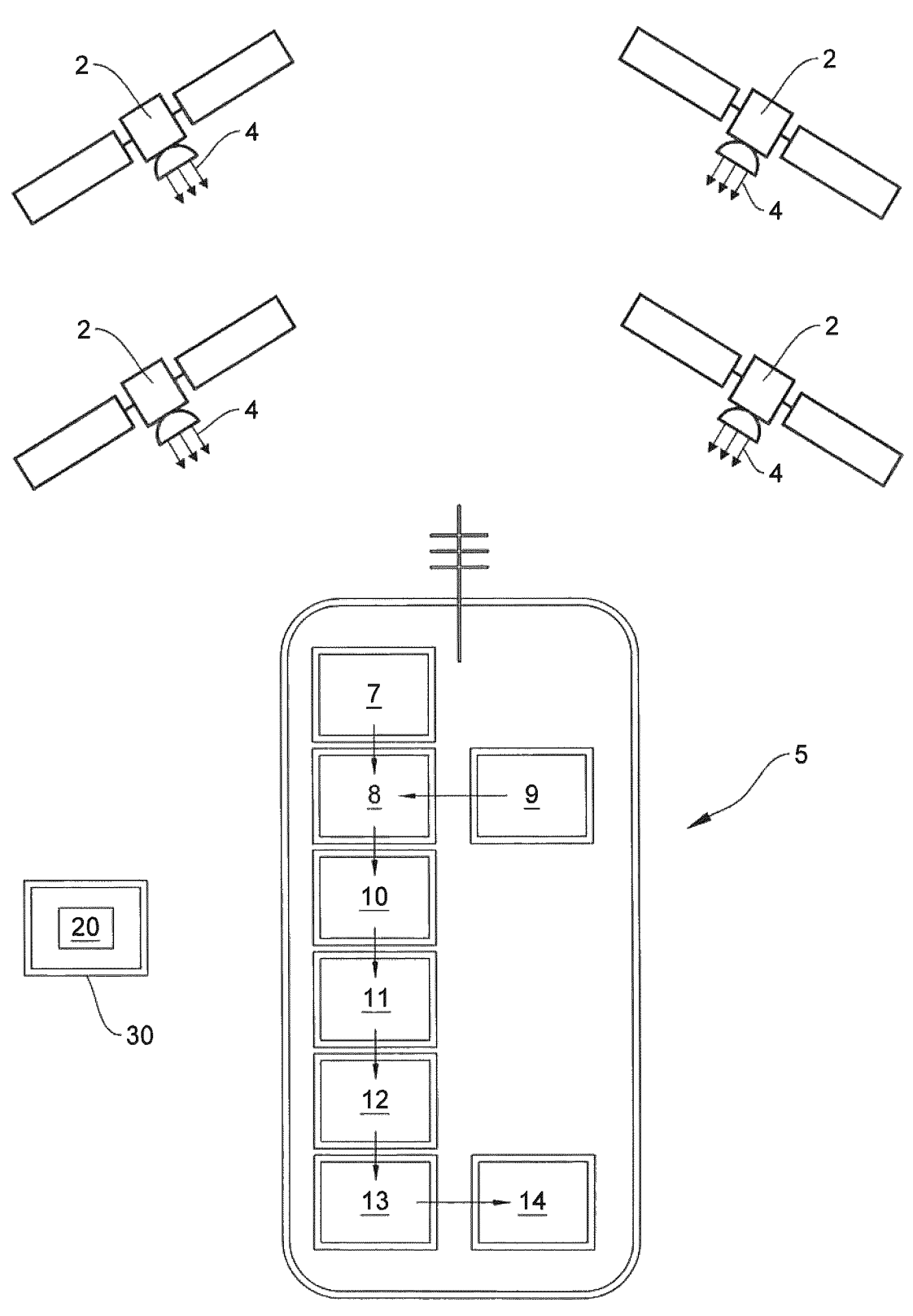
FIG. 1 schematically illustrates a first part of a method for providing a Differential Code Bias correction according to a first preferred embodiment of the present disclosure, FIG. 2 schematically illustrates a second part of the method for providing Differential Code Bias according to a first preferred embodiment of the present disclosure.

In FIG. 1 a method for determining the positon of a mobile receiver 5 by using a global navigation satellite system (GNS system) is illustrated. A global navigation satellite system comprises satellites 2 orbiting around the earth 14 and emitting navigation signals 4 modulated on a number of carrier frequencies. The navigation signals 4 are received by a mobile receiver 5, such as a mobile navigation system that might be incorporated in a mobile unit and/or a vehicle, via an antenna 6. The received navigation signal 4 comprises raw data for determining the position, in particular the actual position, of the mobile receiver 5. The antenna 6 is connected to a band pass filter and low noise amplifier 7, in which the received navigation signal 4 are amplified. In a subsequent down converter 8 that is connected to the band pass filter and low noise amplifier 7 and to a reference oscillator 9, the received navigation signal 4 is converted to lower frequencies using the oscillating signal from the reference oscillator 9. The down-converted navigation signal is passing a band pass and sampling unit 10, in which the analog navigation signal 4 is sampled. The sampled navigation signal 4 is then passed to a tracking unit 11, where the navigation signals 4, in particular phases of carrier signals and/or the delay of code signals included in the navigation signal 4, are tracked. The tracking unit 11 is followed by a bias subtraction unit 12, in which phase and/or code biases are subtracted from the phases of the carrier signals and from the code signal. A subsequent position estimation unit 13 determines the actual position of the navigation device 5 based on phase signal obtained by processing the carrier signal and based on the codes signals. The results of the position estimation can finally be displayed on a monitoring device 14.

The received GNS signal 4 is used by the mobile receiver 5 to generate pseudorange and carrier-phase measurements and decode the navigation data containing the coarse satellite position, clock offset and signal biases. In addition, the mobile receiver 5 decodes the correction data information 20 disseminated from a subset of the tracked satellites 2 on a subset of the GNS signals 4. The precise correction data is then used in combination with the coarse navigation data to precisely model the pseudorange and carrier-phase measurements and possibly correct for atmospheric delays. The precisely modelled observations enable the mobile receiver, to compute a precise estimate of the position, in particular the actual position, using PPP.

Figure 2:
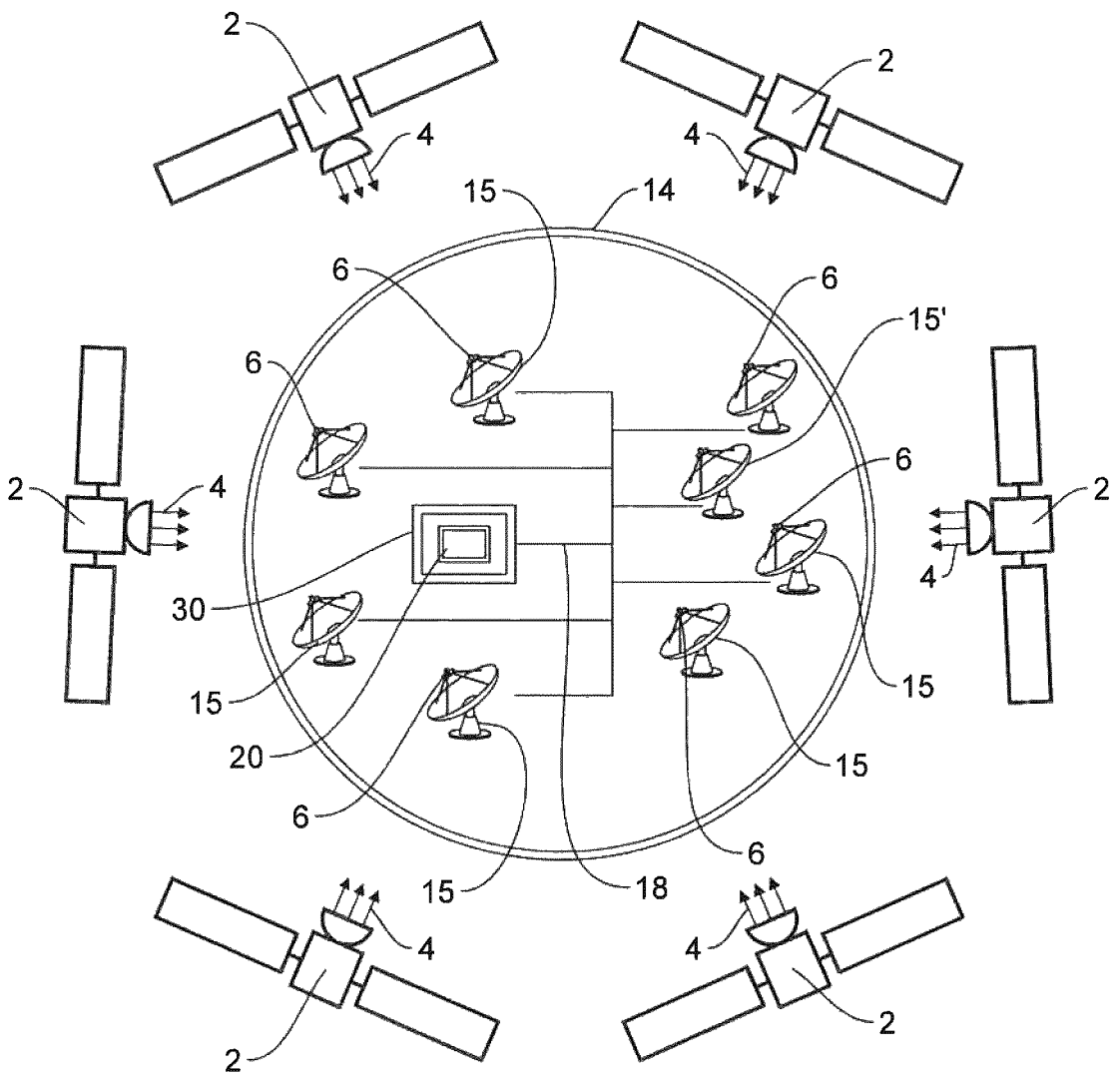

In FIG. 2 reference stations 15 are illustrated. These reference stations 15 are distributed around the globe 14 and receive the navigation signals 4 by their antennas 6. The reference stations 15 generate raw observable data, which are used to determine correction information 20 by using the fact that the position of the reference station 15 is known as well as multiple reference stations are receiving the navigation signal from the GNS satellites. Further the reference stations can be used to determinate and/or to estimate a DCB for a first signal and a second signal and in particular to determinate and/or to estimates its time evaluation. Differential Code Biases (DCBs) are systematic errors, or biases, between two GNSS code observations at the same or different frequencies. The DCB are evaluated based on empirical information gathered by a plurality of reference stations receiving the signals of the corresponding satellite. Proper knowledge of DCBs is crucial to many navigation applications but also to non-navigation applications such as ionospheric analysis, for example extracting ionosphere total electron content (TEC), and time transfer. DCBs are required particularly for code-based positioning of GNSS receivers and other applications In contrast to a Real Time Kinematic (RTK) solution, which requires a local base station and a link to the mobile receiver in proximity of a few km for distribution of the correction data, the Precise Point Positioning (PPP) technique performing code-based positioning works globally, hence without local base station and direct radio link with the mobile receiver. Here the correction information 20, which takes into account corrections for satellite orbit and clock, offsets errors, ionospheric delay, tropospheric delay, code biases and/or phase biases are transmitted to the mobile receiver 5 via satellite 2.

For determining the correction information 20 it is provided to receive raw data of a set of several satellites 2 by at least one reference station 15. Furthermore, there are additional reference stations 15 that receive raw data from another set of satellites 2 or the same set of satellites 2. Furthermore, it is provided that the received raw data are forwarded to a central computation unit 30, preferably in form of a data stream 18. In particular, the raw data included in the data stream 18 are each assigned to a certain reference station 15.

Preferably, the raw data assigned to the respective reference station 15 are forwarded to the central computation unit 30 together with other raw data from different reference stations 15 in a data stream 18, in particular in a common data stream. The central computation unit 30 comprises a processor that is configured to determinate the correction information 20, in particular for each of the satellites 2 individually.

Figure 3:
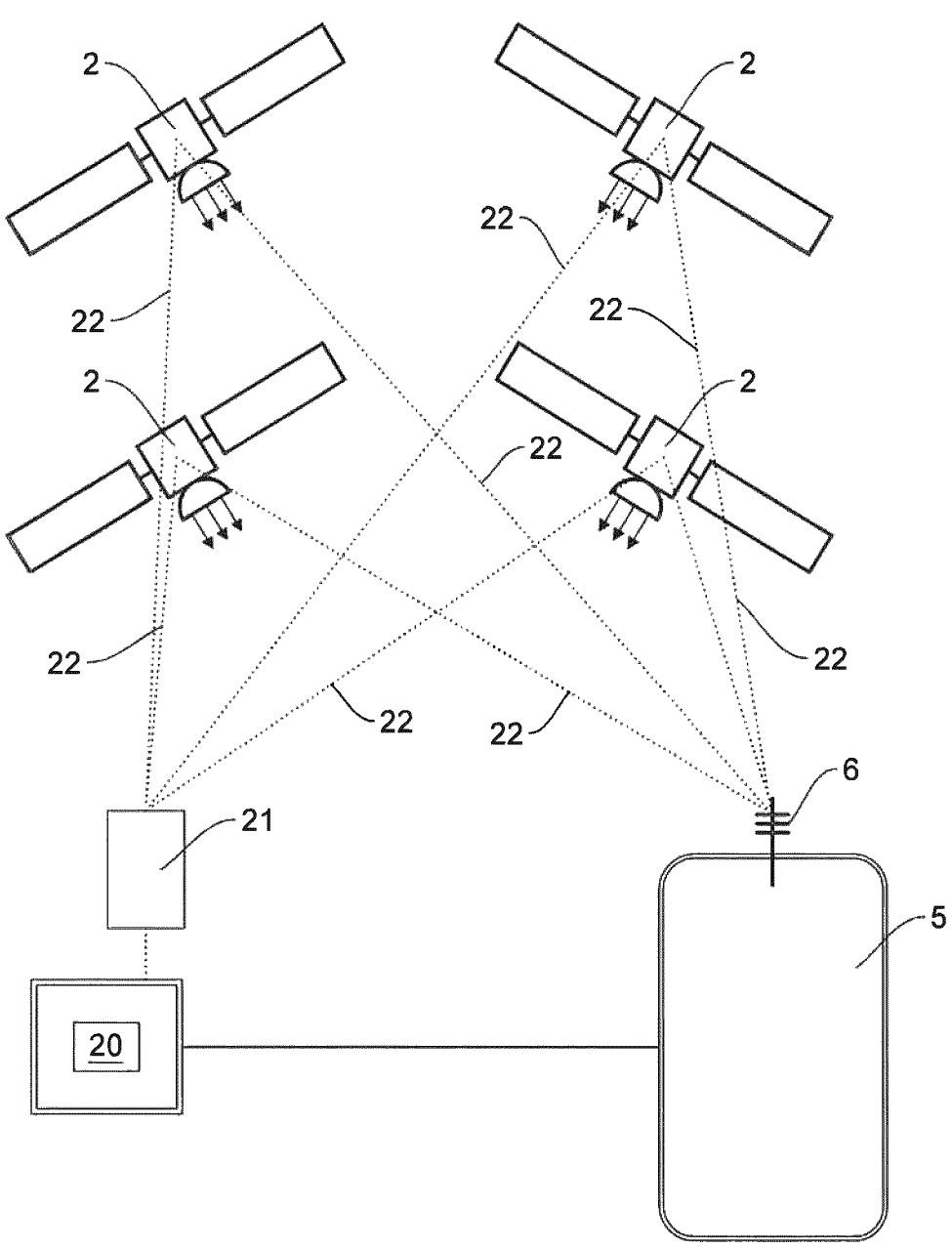

The determined, in particular calculated, authenticated correction information 20 is transmitted from the central computation unit 30 to the mobile receiver 5 via at least one satellite 2 as it is illustrated in FIG. 3. For example, the correction information is up-linked at an uplink station 21 such that a correction signal 22 including the correction information 20 is transmitted to the mobile receiver 5 via the at least one satellite 2. Preferably, the respective correction information 20 is provided to the mobile receiver 5 by several satellites 2, in particular all satellites 2 that are available for the mobile receiver 5.

Figure 4:
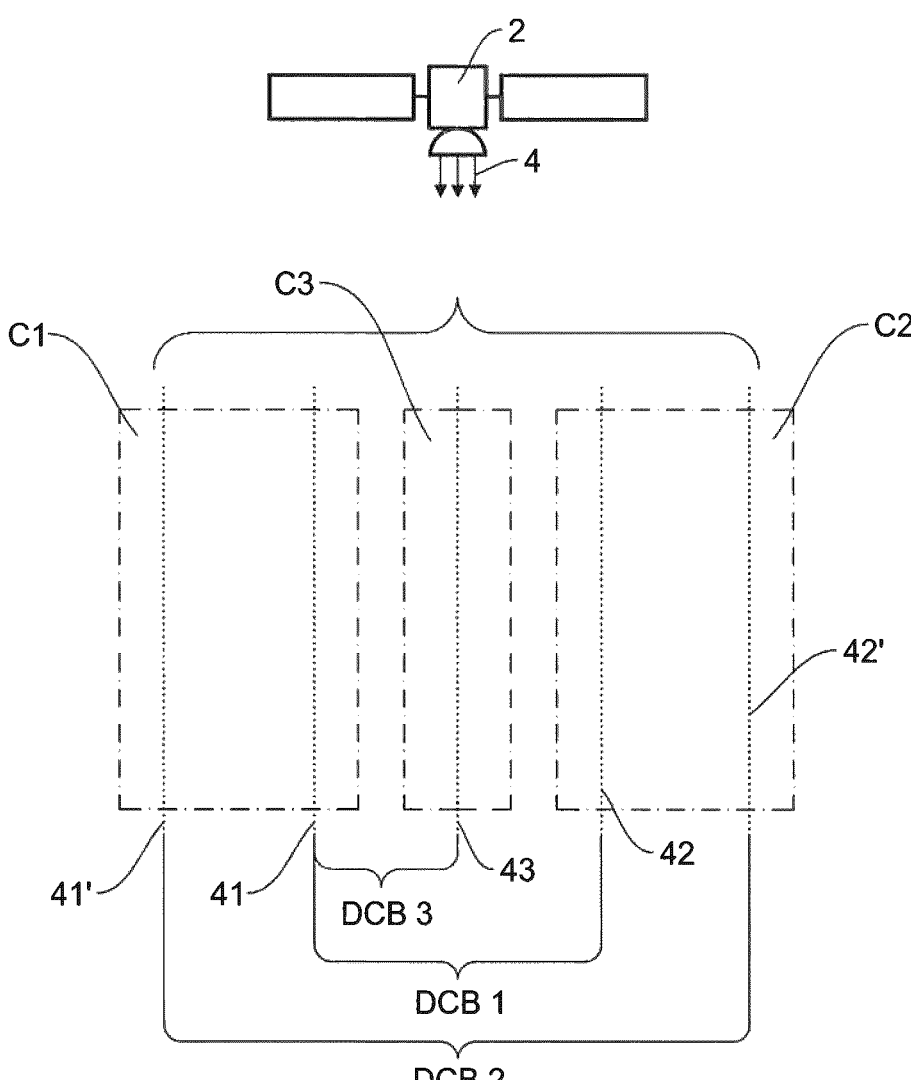

FIG. 4 shows a satellite 2 emitting a navigation signal 4 for a method according to a preferred embodiment of the present disclosure. The term "navigation signal 4" is used here as a generic term for signals being emitted by the satellite 2 for communicating with the mobile receiver 5 and/or the reference station 15. In particular, the navigation signal 4 comprises at least a first signal 41 having a first carrier frequency C1 and a second signal 42 having a second carrier frequency C2. Furthermore, a third signal 43 having a third carrier frequency C3 is included in the navigation signal 4. In the Galileo GNSS, the first carrier frequency C1, the second carrier frequency C2 and the third carrier frequency C3 are represented respectively by the frequency bands E1, E6 and E5. The first signal 41, the second signal 42 and/or the third signal 43 include certain information, by modulating the signal 41, 42, 43 having the corresponding carrier frequency. Particularly, the first signal 41 and the third signal 43 are used for performing a dual frequency method to eliminate or to reduce such effects being caused by the ionosphere and would otherwise result in a corresponding time delay for the travelling time of the signals 41, 42 and 43. Especially, it is provided to determine a further third differential code bias DCB3 for the first signal 41 and the third signal 43.

Furthermore, the second signal 42 includes the correction information 20 used for precise point positioning PPP. In other words, the second signal 42 mainly corresponds to the correction signal 22 presented or illustrated in picture 3. Besides the first signal 41, the second signal 42 and the third signal 43, it is also known that the navigation signal 4 can comprise an additional first signal 41' having the first carrier frequency C1 and an additional second signal 42' having the second carrier frequency C2. In particular, it is provided that both the first signal 41 and the additional first signal 41' use the same first carrier frequency C1, whereas the second signal 42 and the additional second signal 42' uses the second carrier frequency C2. It is obvious for the skilled person that the carrier frequency C1, the second carrier frequency C2 and the third carrier frequency C3 represent frequency interval such that using the same first carrier frequency C1 means that the first signal 41 and/or the additional first signal 41' uses frequency of the same frequency band.

The same applies for the second signal 42 and the additional second signal 42' in the second carrier frequency interval or band. The additional first signal 41' and the additional second signal 42' might not be used by the majority of users, i. e. mobile receivers 5. For example, the additional first signal 41' and/or the additional second signal 42' includes information that were not needed during the normal operation. For example, the receiver 5 has no access to the additional first signal 41' and/or the additional second signal 42'. For example, the additional first signal 41' and/or the additional second signal 42' are encrypted, such that the receiver 5 has no access or a limited access to the additional first signal 41' and/or the additional second signal 42'. The additional first signal 41' and/or the additional second signal 42' were particularly handled by reference stations 15' that differ from those reference stations 15 handling only the first signal 41 and the second signal 42 and/or the third signal 43. Thereby, the number of reference stations 15 handling the first signal 41, the second signal 42 and/or third signal 43 is significantly greater than the number of reference stations 15' handling the additional first signal 41' and/or the additional second signal 42'. Preferably, the additional second signal 42' comprises correction information 20 used for precise point positioning PPP.

For taking into account the secondary differential code bias DCB2 between the additional first signal 41' and the additional second signal 42', the GNSS in the state of the art needs to rely on the reference stations 15' handling the additional first signal 41' and the additional second signal 42'. Calculating or determining the secondary differential code bias DCB2 not only causes additional computing effort, but also results in a differential code bias that might be less reliable, since the secondary code bias DCB2 is based on the reduced number of reference stations 15' handling the additional first signal 41' and the additional second signal 42'.

For reducing the computing effort and improving the reliability of the secondary differential code bias DCB2, it is provided to determine a first differential code bias DCB1 between the first signal 41 and the second signal 42. Subsequently, the primary differential code bias DCB1 can be used for determining the secondary differential code bias DCB2, in particular by transferring the primary differential code bias DCB1 to the secondary differential code bias DCB2. This proceeding has the benefit of transferring the primary differential code bias DCB1 to the secondary differential code bias DCB2, wherein the first differential code bias DCB1 and the secondary differential code bias DCB2 are evaluated on the basis of the same carrier frequencies.

The invention claimed is:

1. A method for providing primary differential code biases and secondary differential code biases, in a global navigation satellite system using satellites communicating by using at least:
   a common signal;
      a first signal and an additional first signal both on a first carrier frequency; and
      a second signal and an additional second signal both on a second carrier frequency;
   wherein primary differential code biases for the first signal and the second signal are determined and provided using the common signal;
   wherein the primary differential code biases are used to calculate secondary differential code biases for the additional first signal and the additional second signal;
   wherein the primary differential code biases concern the differential code bias between the first signal and the second signal to the common signal, and the secondary differential code biases concern the relation between the first additional signal and the first signal and/or the differential code bias between the second signal and the additional second signal;
   wherein the primary differential codes are determined for the first signal and the second signal and provided for determining the secondary differential code biases of the additional first signal and the additional second signal, by using further primary differential codes concerning the differential code bias between the first additional signal and the second additional signal to the common signal;
   wherein the common signal is used to calculate both of the primary code bias and the secondary differential code bias;
   wherein the common signal is used to determine at least two primary differential code biases, namely DCB1-First (first signal–common signal) and DCB1-Second (second signal–common signal) and further primary differential code biases DCB1-First-Additional (first additional signal–common signal) and DCB1-Second-Additional (second additional signal–common signal);
   wherein two dependent secondary differential codes biases (DCB2s) are provided based on the four independent primary differential code biases (DCB1-First, DCB1-Second, DCB1-First-Additional, and DCB1-Second-Additional)
   wherein the primary differential code biases and the secondary differential code biases are provided to the receiver for being used to determine the precise position of the receiver;
   wherein the information for differential code bias of the additional first signal and the additional second signal are limited due to a limited number of reference stations which are used for providing data for calculating the necessary information, and the first signal and the additional first signal are tracked by a first receiver;
   wherein the second signal and the additional second signal are tracked by a second receiver;
   wherein the additional first signal and the additional second signal are handled by first reference stations among the reference stations, whereas the first signal and the second signal are handled by different reference stations from the first reference stations, the different reference stations which only handle the first signal and the second signal but not the additional first signal and/or the additional second signal;
   wherein the common signal is tracked by the first receiver and the second receiver;
   wherein the first receiver and the second receiver are different types of receivers;
   wherein the first receiver and the second receiver differ in the ability to observe and/or analyze specific signals;
   wherein while the first receiver can observe and/or analyze the first signal and the second signal, the first receiver cannot observe and/or analyze the additional first signal and the additional second signal;
   wherein the first receiver and the second receiver have different public regulated service (PRS) certifications;
   wherein correction information is determined at a computation unit based on raw data received from different reference stations; and
   wherein the correction information is transmitted via at least one satellite to a mobile receiver for determining a position of the mobile receiver.

2. The method according to claim 1, wherein a common signal is used for both approximating the primary differential code bias and the secondary differential code bias.

3. The method according to claim 1, wherein the first signal and a third signal, having a third frequency, are used for dual frequency measurements.

4. The method according to claim 1, wherein a time evaluation of the primary differential code biases and/or the secondary differential code biases is determined.

5. The method according to claim 1, wherein the primary differential code bias and/or the secondary differential code biases is provided in real time.

6. The method according to claim 1, further comprising:
   the raw data is received from satellites at a plurality of reference stations;
   the raw data received at the reference stations is forwarded to a central computation unit in a real-time data stream.

7. A network including a plurality of reference stations and a central computation unit including a microprocessor configured to process program code for performing the method according to claim 1.

8. A plurality of reference stations and a central computation unit including a microprocessor, configured to calculate primary differential code biases and secondary differential code biases, in a global navigation satellite system using satellites communicating by using at least:

a common signal;

a first signal and an additional first signal both having a first carrier frequency; and a second signal and an additional second signal both having a second carrier frequency;

wherein primary differential code biases for the first signal and the second signal are determined by the central computation unit using the common signal;

wherein primary differential code biases are used to calculate, and providing, secondary differential code biases for the additional first signal and the additional second signal;

wherein the primary differential code biases concern the differential code bias between the first signal and the second signal to the common signal, and the secondary differential code biases concern the relation between the first additional signal and the first signal and/or the differential code bias between the second signal and the additional second signal;

wherein the primary differential codes are determined for the first signal and the second signal and provided for determining the secondary differential code biases of the additional first signal and the additional second signal, by using further primary differential codes concerning the differential code bias between the first additional signal and the second additional signal to the common signal;

wherein the common signal is used to calculate both the primary code bias and the secondary differential code bias;

wherein the common signal is used to determine at least two primary differential code biases, namely DCB1-First (first signal–common signal) and DCB1-Second (second signal–common signal) and further primary differential code biases DCB1-First-Additional (first additional signal–common signal) and DCB1-Second-Additional (second additional signal–common signal);

wherein two dependent secondary differential codes biases (DCB2$s$) are provided based on the four independent primary differential code biases (DCB1-First, DCB1-Second, DCB1-First-Additional, and DCB1-Second-Additional)

wherein the primary differential code biases and the secondary differential code biases are provided to the receiver for being used to determine the precise position of the receiver; characterized in that:

the information for differential code bias of the additional first signal and the additional second signal are limited due to a limited number of reference stations which are used for providing data for calculating the necessary information, and the first signal and the additional first signal are tracked by a first receiver;

wherein the second signal and the additional second signal are tracked by a second receiver;

wherein the additional first signal and the additional second signal are handled by first reference stations among the reference stations, whereas the first signal and the second signal are handled by different reference stations from the first reference stations, the different reference stations which only handle the first signal and the second signal but not the additional first signal and/or the additional second signal;

wherein the common signal is tracked by the first receiver and the second receiver;

wherein the first receiver and the second receiver are different types of receivers;

wherein the first receiver and the second receiver differ in the ability to observe and/or analyze specific signals;

wherein while the first receiver can observe and/or analyze the first signal and the second signal, the first receiver cannot observe and/or analyze the additional first signal and the additional second signal;

wherein the first receiver and the second receiver have different public regulated service (PRS) certifications; and wherein the central computation unit is further configured to:

determine correction information based on raw data provided from different reference stations; and transmit the correction information via at least one satellite to a mobile receiver for determining a position of the mobile receiver.

9. The plurality of reference station and the central computation unit according to claim 8, further configured for:

receiving raw data from satellites at a plurality of said reference stations; and forwarding the raw data received at the reference stations to said central computation unit using a data stream.

10. The plurality of reference stations and the central computation unit according to claim 9, comprising a reference station handling the additional first signal and/or the additional second signal.

* * * * *